United States Patent
Simcoe et al.

(10) Patent No.: US 7,984,166 B2
(45) Date of Patent: Jul. 19, 2011

(54) TRIVIAL FILE TRANSFER PROTOCOL (TFTP) FILE SEGMENT AND FILE ADDRESS OPTIONS

(75) Inventors: Nathaniel John Simcoe, Phoenix, AZ (US); Steven James Darr, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 37 days.

(21) Appl. No.: 12/552,668

(22) Filed: Sep. 2, 2009

(65) Prior Publication Data
US 2011/0055422 A1    Mar. 3, 2011

(51) Int. Cl.
*G06F 15/16* (2006.01)

(52) U.S. Cl. ........................ 709/228; 709/230

(58) Field of Classification Search .................. None
See application file for complete search history.

(56) References Cited

U.S. PATENT DOCUMENTS

| | | | |
|---|---|---|---|
| 6,049,826 A * | 4/2000 | Beser | 709/222 |
| 6,185,623 B1 * | 2/2001 | Bailey et al. | 709/238 |
| 6,185,678 B1 | 2/2001 | Arbaugh et al. | |
| 6,345,302 B1 | 2/2002 | Bennett et al. | |
| 6,968,386 B1 | 11/2005 | Benayoun et al. | |
| 6,976,058 B1 | 12/2005 | Brown et al. | |
| 7,203,615 B2 | 4/2007 | Mao et al. | |
| 7,346,672 B2 | 3/2008 | Harvey, IV | |
| 7,379,982 B2 | 5/2008 | Tabbara | |
| 7,395,344 B2 | 7/2008 | Sandell et al. | |
| 2003/0182404 A1 * | 9/2003 | Saint-Etienne et al. | 709/220 |
| 2005/0177625 A1 * | 8/2005 | Paek et al. | 709/219 |
| 2005/0267860 A1 | 12/2005 | Benguigui | |
| 2006/0031748 A1 | 2/2006 | Brady, Jr. et al. | |
| 2007/0083628 A1 | 4/2007 | Sandstrom | |
| 2007/0130281 A1 * | 6/2007 | Sandell et al. | 709/216 |
| 2008/0250155 A1 | 10/2008 | Wang et al. | |
| 2009/0045981 A1 | 2/2009 | Jean et al. | |

OTHER PUBLICATIONS

Finlayson, Ross, "Bootstrap Loading Using TFTP", "http://www.rfc-editor.org/rfc/rfc906.txt", Jun. 1984.
Malkin et al., "TFTP Blocksize Option", "http://www.rfc-editor.org/rfc/rfc2348.txt", May 1998, Publisher: The Internet Society.
Malkin, G. and A. Harkin, "TFTP Option Negotiation Analysis", "http://www.rfc-editor.org/rfc/rfc1785.txt", Mar. 1995.
Malkin, G., "TFTP Option Extension", "http://www.rfc-editor.org/rfc/rfc2347.txt", May 1998, Publisher: The Internet Society.
Sollins, K.R., "The TFTP Protocol Revision 2", "http://www.rfc-editor.org/rfc/rfc783.txt", Jun. 1981.
Sollins, K., "The TFTP Protocol Revision 2", "http://www.rfc-editor.org/rfc/rfc1350.txt", Jul. 1992.
Malkin, G., "TFTP Timeout Interval and Transfer Size Options", "http://www.rfc-editor.org/rfc/rfc2349.txt", May 1998, Publisher: The Internet Society.

* cited by examiner

*Primary Examiner* — Phuoc Nguyen
(74) *Attorney, Agent, or Firm* — Fogg & Powers LLC

(57) ABSTRACT

A method of transferring data using a Trivial File Transport Protocol (TFTP) comprises sending a request packet from a client to a server, the request packet comprising a first TFTP option requesting that a segment of a grouping of data be transferred, and if an option acknowledgment packet comprising a second TFTP option corresponding to the first TFTP option is received at the client from the server, transferring the segment of the grouping of data as indicated in the second TFTP option using TFTP.

18 Claims, 12 Drawing Sheets

TRIVIAL FILE TRANSFER PROTOCOL (TFTP) FILE SEGMENT AND FILE ADDRESS OPTIONS

BACKGROUND

The Trivial File Transfer Protocol (TFTP) is a simple file transfer protocol that is widely used. TFTP can be used by a first TFTP agent (also referred to here as a "TFTP client") to write a file to a second TFTP agent (also referred to here as a "TFTP server"). TFTP can also be used by a TFTP client to read a file from a TFTP server. The details of TFTP are defined in various Internet Engineering Task Force (IETF) Request for Comments (RFC) documents, including RFC 783 (TFTP Protocol (revision 1)), RFC 1350 (TFTP Protocol (revision 2)), RFC 906 (Bootstrap loading using TFTP), RFC 1785 (TFTP Option Negotiation Analysis), RFC 2347 (TFTP Option Extension), RFC 2348 (TFTP Blocksize Option), and RFC 2349 (TFTP Timeout Interval and Transfer Size Options). The TFTP described in such IETF RFC documents is also referred to here as "standard TFTP."

Although the various IETF RFC documents that define standard TFTP do not place a limit on the size of file that can be transferred using standard TFTP, buffers used in actual TFTP implementations typically limit the size of file that can be transferred using such TFTP implementations. If a file is too large for a buffer in either the TFTP client or TFTP server, the file typically cannot be transferred using standard TFTP. Also, standard TFTP only provides a means to request a file by file name. That is, standard TFTP assumes that some sort of file system is used on the TFTP server and TFTP client. As a result, standard TFTP by itself is typically not used in applications where large files need to be transferred or where data that is not stored in a file system needs to be transferred.

One such application is the cross loading of data from one flight management computer (FMC) to another. As used herein, "cross loading" refers to copying all or part of the data residing in the memory of one FMC to the memory of another FMC. The data residing in the memory of an FMC is also referred to here as a "memory image." Some avionics standards, such as Aeronautical Radio, Incorporated (ARINC) Standard 615A, specify that standard TFTP can be used for loading data from a file stored in a file system into the memory of a target device. This type of transfer is also referred to here as "data loading." Unlike with data loading, standard TFTP typically cannot be used to cross load a memory image (or a part thereof) from the memory of one FMC to the memory of another FMC since a file system is not used to manage the data stored within the memory of the FMCs. Also, because modern flight management computers use large amounts of memory (for example, one or more gigabytes), the size of the resulting memory images typically exceed the size of the buffers used in the TFTP software that is otherwise used for data loading.

SUMMARY

One embodiment is directed to a method of transferring data using a Trivial File Transport Protocol (TFTP) is provided. The method comprises sending a request packet from a client to a server, the request packet comprising a first TFTP option requesting that a segment of a grouping of data be transferred, and if an option acknowledgment packet comprising a second TFTP option corresponding to the first TFTP option is received at the client from the server, transferring the segment of the grouping of data as indicated in the second TFTP option using TFTP.

Another embodiment is a system comprising a first node and a second node. The first and second nodes comprise a respective network interface to communicatively couple that node to the other node and a respective programmable processor coupled to the respective network interface, wherein the programmable processor executes software that includes TFTP software. The TFTP software included in the first node is configured to send a read request packet from the first node to the second node, wherein the read request packet identifies data to be transferred from the second node to the first node and wherein the read request packet comprises a first TFTP option requesting that the second node specify a physical address where the first node should start storing the requested data. The TFTP software included in the second node is configured to receive the read request packet and if the TFTP software in the second node is able to satisfy the read request, the TFTP software included in the second node sends an option acknowledgment packet comprising a second TFTP option corresponding to the first TFTP option, wherein the second TFTP option specifies the physical address where the first node should start storing the requested data. The TFTP software included in the first node is also configured to receive the option acknowledgment packet. The TFTP software included in the first node and the TFTP software included in the second node are configured to transfer the requested data from the second node to the first node. The TFTP software included in the first node is configured to store the transferred data at the first node starting at the physical address.

In another embodiment, a program product for transferring data using a Trivial File Transport Protocol (TFTP) comprises a processor-readable medium on which program instructions are embodied, wherein the program instructions are operable, when executed by at least one programmable processor included in a device, to cause the device to receive a request packet comprising a first TFTP option requesting that a segment of a grouping of data be transferred, the request packet being sent from a client. If the device is able to satisfy the request, the program product causes the device to send an option acknowledgment packet comprising a second TFTP option to the client that corresponds to the request packet and transfer the segment using TFTP for storage at one of the device and the client.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
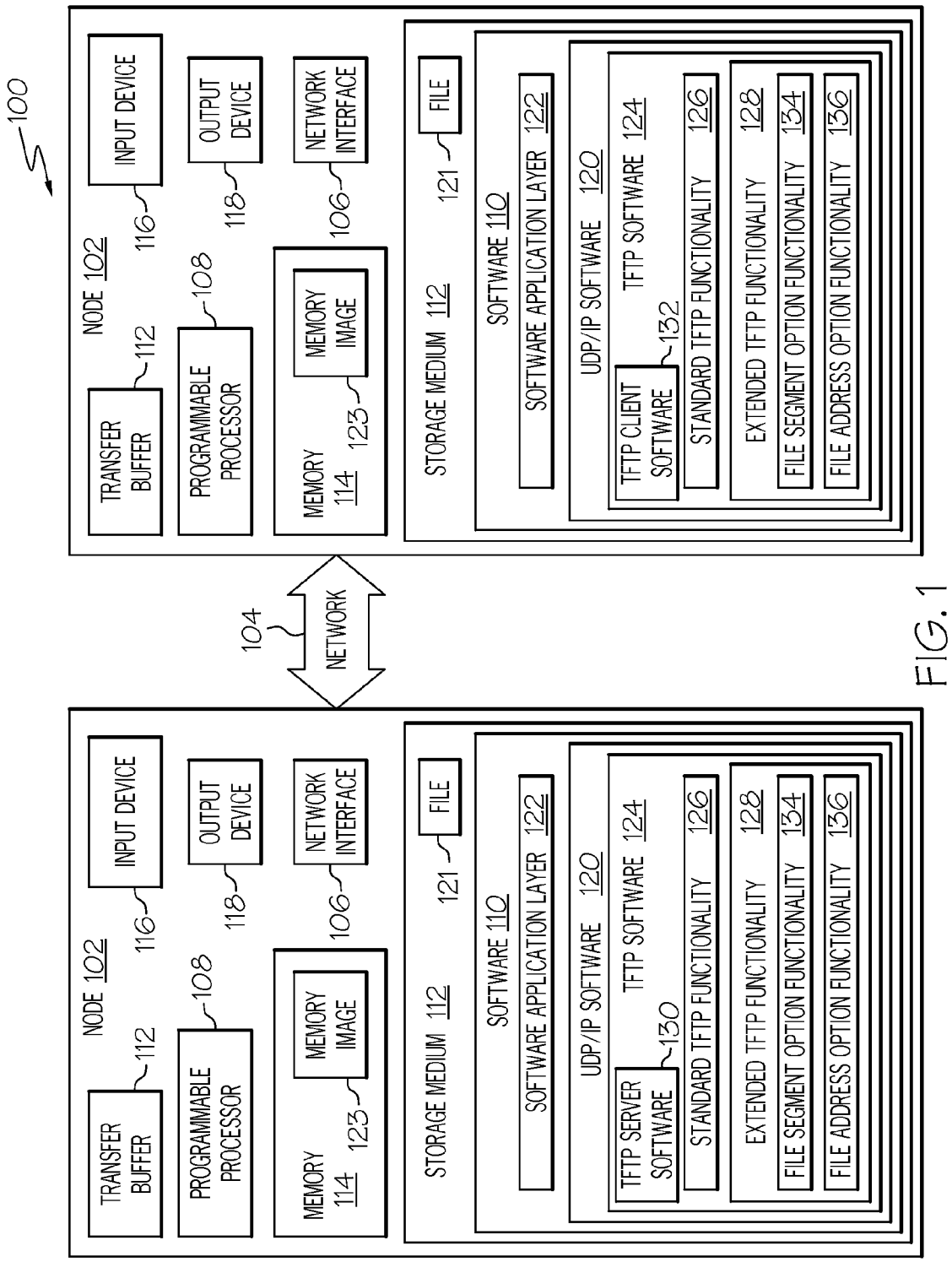
FIG. 1 is a block diagram of one embodiment of a system that employs extended TFTP functionality to transfer data.

FIG. 1 is a block diagram of one embodiment of a system 100 that employs extended TFTP functionality to transfer data. The system 100 comprises at least two nodes 102 that are communicatively coupled to one another using at least one network 104, which can be implemented using wired and/or wireless communication links. Each node 102 includes an appropriate network interface 106 to communicatively couple the respective node 102 to the network 104. In one implementation of such an embodiment, the network 104 is implemented, at least in part, using an Ethernet local area network (LAN). As described in more detail below, the nodes 102 use the User Datagram Protocol/Internet Protocol (UDP/IP) suite of protocols to communicate over the network 104.

In the embodiment shown in FIG. 1, each of the nodes 102 further comprises one or more programmable processors 108 for executing software 110. The software 110 in each node 102 comprises program instructions that are stored (or otherwise embodied) on or in an appropriate storage medium or media 112 (such as flash or other non-volatile memory, magnetic disc drives, and/or optical disc drives) from which at least a portion of the program instructions are read by the programmable processor 108 for execution thereby. Although the storage media 112 is shown in FIG. 1 as being included in, and local to, the respective node 102, it is to be understood that removable media and/or remote storage media (for example, storage media that is accessible over the network 104) can also be used. Each node 102 also includes memory 114 for storing the program instructions (and any related data) during execution by the programmable processor 108. Memory 114 comprises, in one implementation, any suitable form of random access memory (RAM) now known or later developed, such as dynamic random access memory (DRAM). In other embodiments, other types of memory are used.

Each node 102 further includes one or more input devices 116 that are communicatively coupled to the respective programmable processor 108 by which a user is able to provide input to that programmable processor 108. Examples of input devices include a keyboard, keypad, touch-pad, pointing device, button, switch, and microphone. Each node 102 also includes one or more output devices 118 that are communicatively coupled to the respective programmable processor 108. Each programmable processor 108 is able to output information or data to a user on or using one or more of the output devices 108. Examples of output devices 118 include visual output devices such as liquid crystal displays (LCDs) or light emitting diodes (LEDs) or audio output devices such as speakers.

The software 110 executed by the programmable processor 108 in each node 102 includes UDP/IP software 120 (also referred to here as the "UDP/IP stack"). The UDP/IP software 120 implements the UDP/IP suite of protocols and enables application-layer software 122 to communicate over the network 104 using the UDP/IP suite of protocols. In the embodiment shown in FIG. 1, the UDP/IP software 120 includes TFTP software 124. In general, the TFTP software 124 includes standard TFTP functionality 126 that implements standard TFTP (as described above) and extended TFTP functionality 128 that implements TFTP features that are not described in the documents that define standard TFTP. The TFTP software 124 can be implemented, for example, by extending or modifying software that implements standard TFTP to further include the extended TFTP functionality 128 described here.

The TFTP software 124 is used to transform the state of, for example, a particular storage device (for example, storage medium 112 and/or memory 114) by transferring data that is stored in that storage device. In one example, a file 121 is transferred from one node 102 to a second node 102 and is stored on a storage medium 112 in the second node 102 using a file system. In another example, a memory image 123 (that is, the contents of the memory 114) transferred from one node 102 to a second node 102 and is stored on in the memory 114 of the second node 102.

For purposes of illustration, only one of the nodes 102 shown in FIG. 1 is described here as acting as a TFTP server (and is also referred to here as the "server" node 102) while the other node 102 shown in FIG. 1 is described here as acting as a TFTP client (and is also referred to here as the "client" node 102). However, it is to be understood that a node 102 can act as both a TFTP server and TFTP client, depending on the particular application for which the system 100 is intended.

The TFTP software 124 in the server node 102 includes TFTP server software 130 that implements the server side of the TFTP protocol as a part of the UDP/IP stack 120. The TFTP server software 130 can be implemented, for example, as a daemon (or other background service or process).

The TFTP software 124 in the client node 102 includes TFTP client software 132 that implements the client side of the TFTP protocol. Although the TFTP client software 132 is logically considered to be a part of the UDP/IP stack 120, at least a part of the TFTP client software 132 can be integrated directly into an item of software that is otherwise considered to reside outside of the UDP/IP stack 120 (for example, application-layer software 122). Also, at least a part of the TFTP client software 132 can be implemented as a library (or other similar mechanism) that other software (for example, application-layer software 122) can link to in order to use the TFTP client software 132 to carry out the client side of the TFTP protocol.

The TFTP server software 130 and the TFTP client software 132 communicate with one another over the network 104 using one or more UDP ports (typically UDP port number 69).

In the embodiment shown in FIG. 1, the extended TFTP functionality 128 includes file segment option functionality 134 and file address option functionality 136. The file segment option functionality 134 is used to implement a TFTP option extension for transferring a single larger grouping of data (for example, a file or memory image) in multiple segments, each of the file segments being transferred in a separate TFTP session. This option extension is also referred to here as the "file segment option." The TFTP file segment option functionality 134 enables a file (or other grouping of data) that is too large for a buffer in the TFTP server and/or the TFTP client to be transferred using TFTP without requiring the use of other software outside of the TFTP software 126 to split up and recombine the file.

The file address option functionality 136 is used to implement a TFTP option extension that provides a mechanism by which a TFTP client can request that a TFTP server provide the TFTP client with a physical address for storing the requested data. In this particular embodiment, the file address option is only valid for use with read requests and not write requests. The file address option is useful in applications where the client node 102 does not use a file system to store the data that is being transferred using TFTP. One example of such an application is using TFTP for cross loading memory images since a memory image is stored in memory without using a file system. In the absence of such file address option functionality 136, some software or other mechanism outside of TFTP would typically need to be used in order to use TFTP to transfer data not stored in a file system. For example, in the absence of the file address option functionality 136 described here, if TFTP were to be used for cross loading memory images, software outside of TFTP would typically need to somehow associate the memory image (or an address of the memory image) with a file name and share such association with the TFTP client.

In this embodiment, the extended TFTP functionality 128 is implemented using the option negotiation mechanism described in IETF RFC 2374 (TFTP Option Extension). As noted in IETF RFC 2374, the option negotiation mechanism described therein is a backward-compatible extension to standard TFTP. It allows file transfer options to be negotiated prior to the transfer using a mechanism that is consistent with the request packet format used in standard TFTP.

In general, the option negotiation mechanism described in RFC 2374 involves the TFTP client sending a TFTP request packet to a TFTP server, where the TFTP request packet contains one or more options appended to it. The request may be a read request (requesting a data transfer from the TFTP server to the TFTP client) or write request (requesting a data transfer from the TFTP client to the TFTP server, which stores the transferred data).

If the TFTP server supports option negotiation as defined in IETF RFC 2347 and the TFTP server recognizes one or more of the options specified in the request packet, the TFTP server responds with an Options Acknowledgment (OACK) packet. Each option the server recognizes, and accepts the value for, is included in the OACK. If a server implementation does not support option negotiation, the server will likely ignore any options appended to the TFTP client's request. In this case, the TFTP server will return a data (DATA) packet (as specified in standard TFTP) for a read request (RRQ) and an acknowledgment (ACK) packet (as specified in standard TFTP) for a write request (WRQ), in both cases thereafter proceeding with normal TFTP data transfer. Also, the TFTP server will respond with an error (ERROR) packet (as specified in standard TFTP) if the TFTP server denies the TFTP client's request for whatever reason.

Figure 2A:
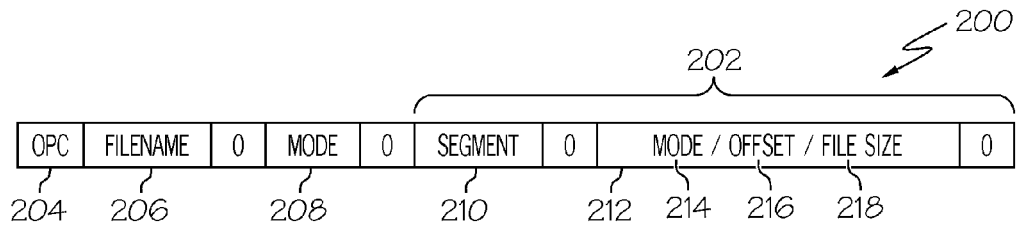
FIG. 2A illustrates one embodiment of a Trivial File Transfer Protocol (TFTP) request packet to which a file segment option has been appended.

FIG. 2A illustrates one embodiment of a TFTP request packet 200 to which a file segment option 202 has been appended using the TFTP Option Extension mechanism described in IETF RFC 2347. The file segment option 202 shown in FIG. 2A is used to transfer a particular segment of a larger grouping of data such as a file or memory image.

The TFTP request packet 200 comprises an operation code field 204 (referred to herein as the "opcode" or "opc" field), a file name field 206, and a mode field 208. The opcode field 204, file name field 206, and mode field 208 are used in the manner specified for standard TFTP. For example, the opcode field 204 is used to indicate what type of request is being made with the request packet 200. As defined in standard TFTP, a 1 is stored in the opcode field 204 if a file read request is being made and a 2 is stored in the opcode field 204 if a file write request is being made. The name of the file being transferred is stored in the filename field 206. The mode field 208 is used to specify the particular standard TFTP file transfer mode to be used for the requested file transfer (that is, "netascii," "octet," or "mail").

After the mode field 208, any number of options can be appended to the TFTP request packet 200. The term "option," as used in connection with a TFTP request packet, refers to a pair of fields that are used to request that a particular optional function be used in connection with the transfer requested in the request packet.

In this example, a file segment option 202 is appended to the TFTP request packet 200. The file segment option 202 includes an option field 210 and a value field 212. The option field 210 includes a predetermined string that identifies that the file segment option should be used to carry out the requested file transfer. One example of a suitable predetermined string is "segment." The value field 212 for the file segment option 202 is used to identify the particular file segment that should be transferred. The value field 212 comprises a string that comprises multiple sub-fields. One exemplary embodiment of the formatting of the value field 212 for the file segment option 202 is shown in FIG. 2A (though it is be understood that the value field 212 can be formatted in different ways). In the exemplary embodiment shown in FIG. 2A, the value field 212 of the file segment option 202 includes a mode sub-field 214, an offset sub-field 216, and a file size sub-field 218, where each sub-field is separated by a "slash" or other character.

The mode sub-field 214 is used to store one of a set of predetermined sub-strings that indicate how the start of the segment to be transferred is identified. Where the TFTP request packet 200 is used to make a read request, offset sub-field 216 is used to specify where the TFTP server would start reading the segment that is being transferred from the TFTP server to the TFTP client. Where the TFTP request packet 200 is used to make a write request, mode sub-field 214 is used to specify where the TFTP server would start writing the segment that is being transferred from the TFTP client to the TFTP server.

In the particular embodiment described here, the file segment option 202 supports two modes—a relative mode that indicates that the value stored in the offset sub-field 216 is an offset relative to the start of the file that the segment is a part of (which is identified in the file name field 206) and an absolute mode that indicates that the value stored in the offset field 216 is an absolute address for the start of the segment to be transferred. In this particular embodiment, only one address space can be used with the absolute mode and the TFTP client and TFTP server need to agree a priori as to what particular address space is to be used with the absolute mode. In other embodiments, additional information can be exchanged by the TFTP client and TFTP server that identifies the particular address space to be used with the absolute mode. The absolute mode can be used, for example, to specify an address within the address space of a physical memory space (for example, within memory 114) in connection with transferring a segment of a memory image since the memory image will typically not have a file name associated with it and the file name field 206 will not include a valid file name. The relative mode can be used, for example, where the file name field 206 stores a valid file name. In the particular embodiment described here, a sub-string of "REL" is used to select relative mode and a sub-string of "ABS" is used to select absolute mode.

The offset sub-field 216 comprises a sub-string that contains either a relative offset (if relative mode is specified in the mode sub-field 214) or an absolute address (if absolute mode is specified in the mode sub-field 214).

The file size sub-field 218 of the file segment option 202, when used in a TFTP request packet 200, comprises a sub-string that contains the maximum file size that can be handled by the TFTP client making the request. In some implementations, this value is dictated by the size of a buffer used in the TFTP client. In other implementations, other considerations may determine this value. If the TFTP client has no limitation on the size of file that it can handle, then the file size sub-field 218 comprises a sub-string containing the value "0" (zero). In the embodiment described here, the maximum file size is used as the segment size if the TFTP server can handle a file that has that size (that is, if the maximum file size for the TFTP server is equal to or greater than the maximum file for the TFTP client).

FIGS. 2B-2E illustrate various examples of TFTP request packets 200 having a file segment option 202 appended thereto. In the example shown in FIG. 2B, the value field 212 of the file segment option contains the string "ABS/00000000/100000", which indicates that absolute mode should be used with an absolute address of 0x00000000 and that the TFTP client is able handle a maximum file size of 1 Mb or 1,048,576 bytes. In this example, the specified segment is the first segment of a memory image that starts at address 0x00000000 and ends at address 0x000FFFFF. In the example shown in FIG. 2C, the value field 212 of the file segment option contains the string "ABS/00100000/100000", which indicates that absolute mode should be used with an absolute address of 0x00100000 and that the TFTP client is able handle a maximum file size of 1 Mb or 1,048,576 bytes. In this example, the specified segment is the second segment of a memory image, where the second segment starts at address 0x00100000 and ends at address 0x001FFFFF.

Figure 2B:
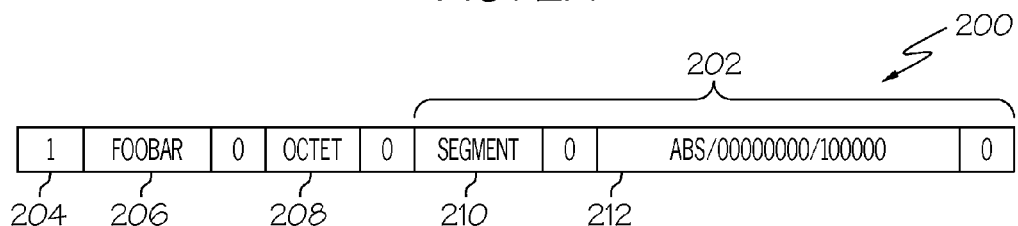
FIGS. 2B-2E illustrate various examples of a TFTP request packets having a file segment option appended thereto.
Figure 2C:
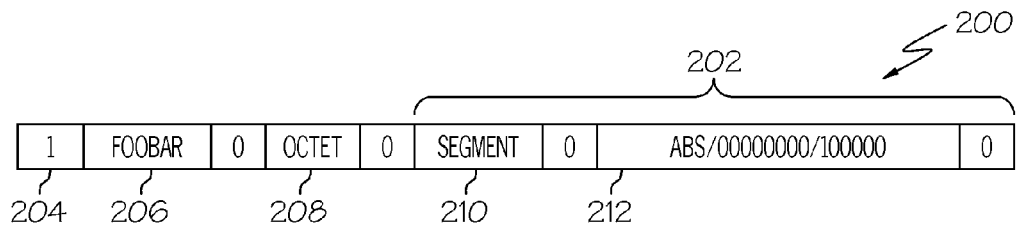
Figure 2D:
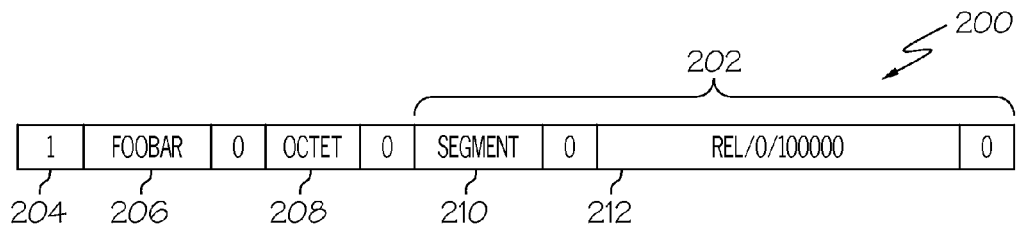
Figure 2E:
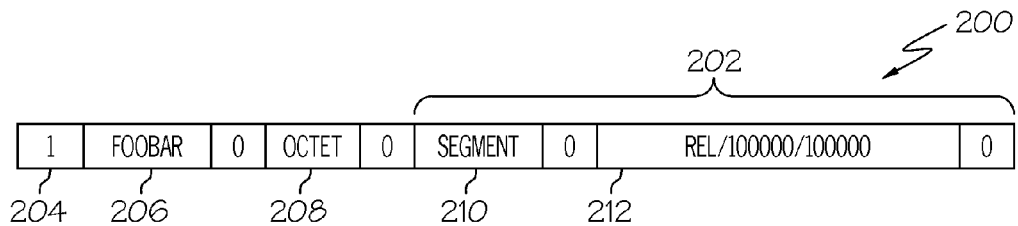

In the example shown in FIG. 2D, the value field 212 of the file segment option contains the string "REL/0/100000", which indicates that relative mode should be used with a relative offset of 0 and that the TFTP client is able handle a maximum file size of 1 Mb or 1,048,576 bytes. In this example, the specified segment is the first segment of a file that starts at the beginning of the file (that is, at an offset of 0) and ends at an offset that is 0x000FFFFF bytes from the beginning of the file. In the example shown in FIG. 2E, the value field 212 of the file segment option contains the string "REL/100000/100000", which indicates that relative mode should be used with a relative offset of 0x00100000 bytes and that the TFTP client is able handle a maximum file size of 1 Mb or 1,048,576 bytes. In this example, the specified segment is the second segment of the file that starts at an offset that is 0x00100000 bytes from the beginning of the file and ends at an offset that is 0x001FFFFF bytes from the beginning of the file.

Figure 3A:
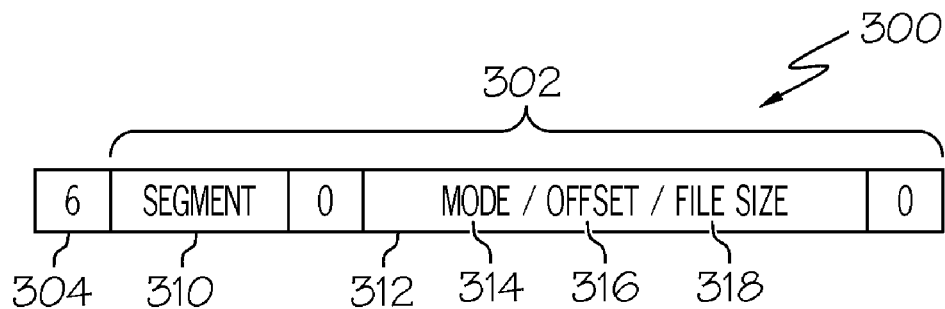
FIGS. 3A-3C illustrate examples of TFTP Options Acknowledgment (OACK) packets that are responsive to the particular example TFTP request packet shown in FIG. 2B.

FIG. 3A illustrates one embodiment of a TFTP Options Acknowledgment (OACK) packet 300 for responding to the TFTP request packet 200 of FIG. 2A that has a file segment option 202 appended thereto. The OACK packet 300 has a file segment option 302 appended to it.

The TFTP OACK packet 300 includes an opcode field 304, which for an OACK packet contains the value "6" and indicates that the packet 300 is an OACK packet. As noted above, an OACK packet 300 will contain a corresponding option for each option that was appended to the corresponding request that the server recognizes and handles. The term "option", as used in connection with a TFTP OACK packet, refers to a pair of fields that are used to respond to a request that a particular optional function be used in connection with the transfer requested in the request packet.

In the particular example shown in FIG. 3A, the OACK packet 300 contains a single option (the file segment option 302) that corresponds to the file segment option 202 appended to the request packet 200. The file segment option 302 in the OACK packet 300 has the same format as the file segment option 202 in the request packet 200.

The file segment option 302 includes an option field 310 and a value field 312. The option field 310 includes the same predetermined string used in the file segment option 202 in the request packet 200 to request that the file segment option be used to carry out the requested file transfer. As noted above, in this example, string "segment" is used. As with the file segment option 202 in the request packet 200, the value field 312 in the OACK packet 300 comprises a string that comprises multiple sub-fields. In the exemplary embodiment shown in FIG. 3A, the value field 312 of the file segment option 302 includes a mode sub-field 314, an offset sub-field 316, and a file size sub-field 318, where each sub-field is separated by a slash or other character. Except as described below, each sub-field in the value field 312 of the OACK packet 300 is used to store the same information as in the request packet 200.

When a TFTP server receives a TFTP request packet 200 having a file segment option 202 appended thereto, the TFTP server checks the file size sub-field 218 to determine if the maximum file size that the TFTP client can support is equal to or less than the maximum file size that the TFTP server can support. If that is the case, the TFTP server responds with an OACK packet 300 in which the file segment option 302 contains the same information as the file segment option 202 appended to the corresponding TFTP request packet. If the maximum file size that the TFTP client can support is greater than the maximum file size that the TFTP server can support or the TFTP client indicated that it has no limit on the size of file that it can handle, the TFTP server responds with an OACK packet 300 in which the file segment option 302 contains the same information as the file segment option 202 appended to the corresponding TFTP request packet except for the file size sub-field 218, in which the TFTP server inserts the maximum file size that the TFTP server can handle.

After sending the OACK packet 302, the TFTP server and TFTP client proceed with the transfer of the requested segment using the values specified in the value field 312 of the OACK packet 300.

Figure 3B:
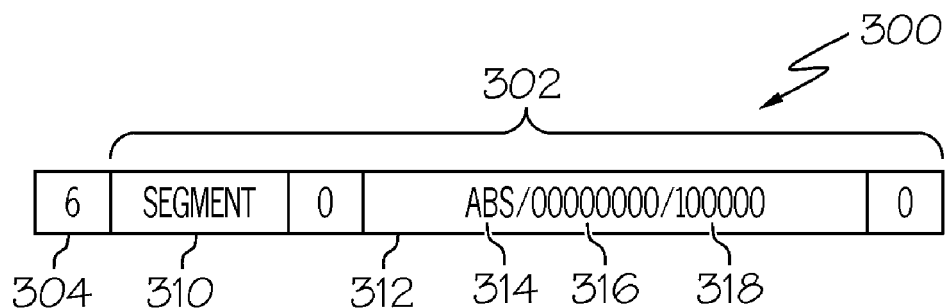
Figure 3C:
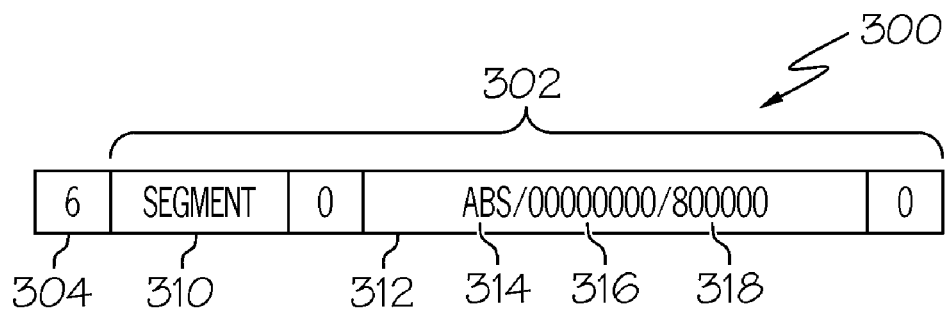

FIGS. 3B-3C illustrate examples of OACK packets 300 that are responsive to the particular example TFTP request packet shown in FIG. 2B. FIG. 3B illustrates an OACK packet 300 that is sent if the TFTP server can support a maximum file size of 1 Mb or 1,048,576 bytes as specified in the file size sub-field 218 of the corresponding request packet 200 show in FIG. 2B. As shown in FIG. 3B, the file segment option 302 of this OACK packet 300 contains the same information (that is, "ABS/00000000/100000") as the file segment option 202 appended to the example TFTP request packet shown in FIG. 2B.

FIG. 3C illustrates an OACK packet 300 that is sent if the maximum file size that the TFTP server can support is less than 1 Mb or 1,048,576 bytes (which is the maximum file size the TFTP client can handle in this example). In this example, the file segment option 302 of the OACK packet 300 contains the same information as the file segment option 202 appended to the example TFTP request packet shown in FIG. 2 except for the file size sub-field 320, in which the TFTP server inserts the maximum file size that the TFTP server can handle (512 Kb or 524,288 bytes in this example).

Figure 4A:
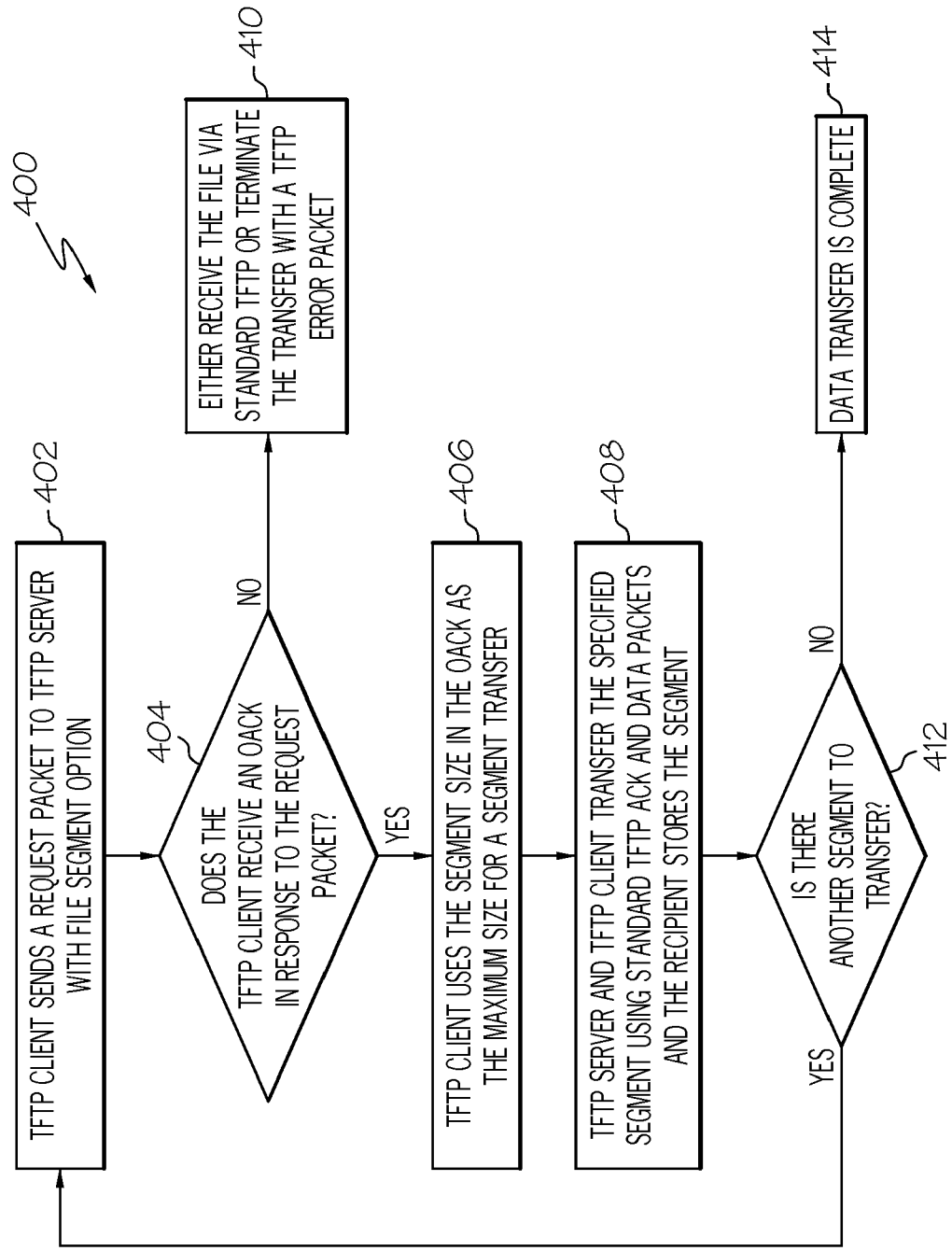
FIGS. 4A and 4B are flow diagrams of one embodiment of methods for implementing the client side and server side, respectively, of a file segment option described.
Figure 4B:
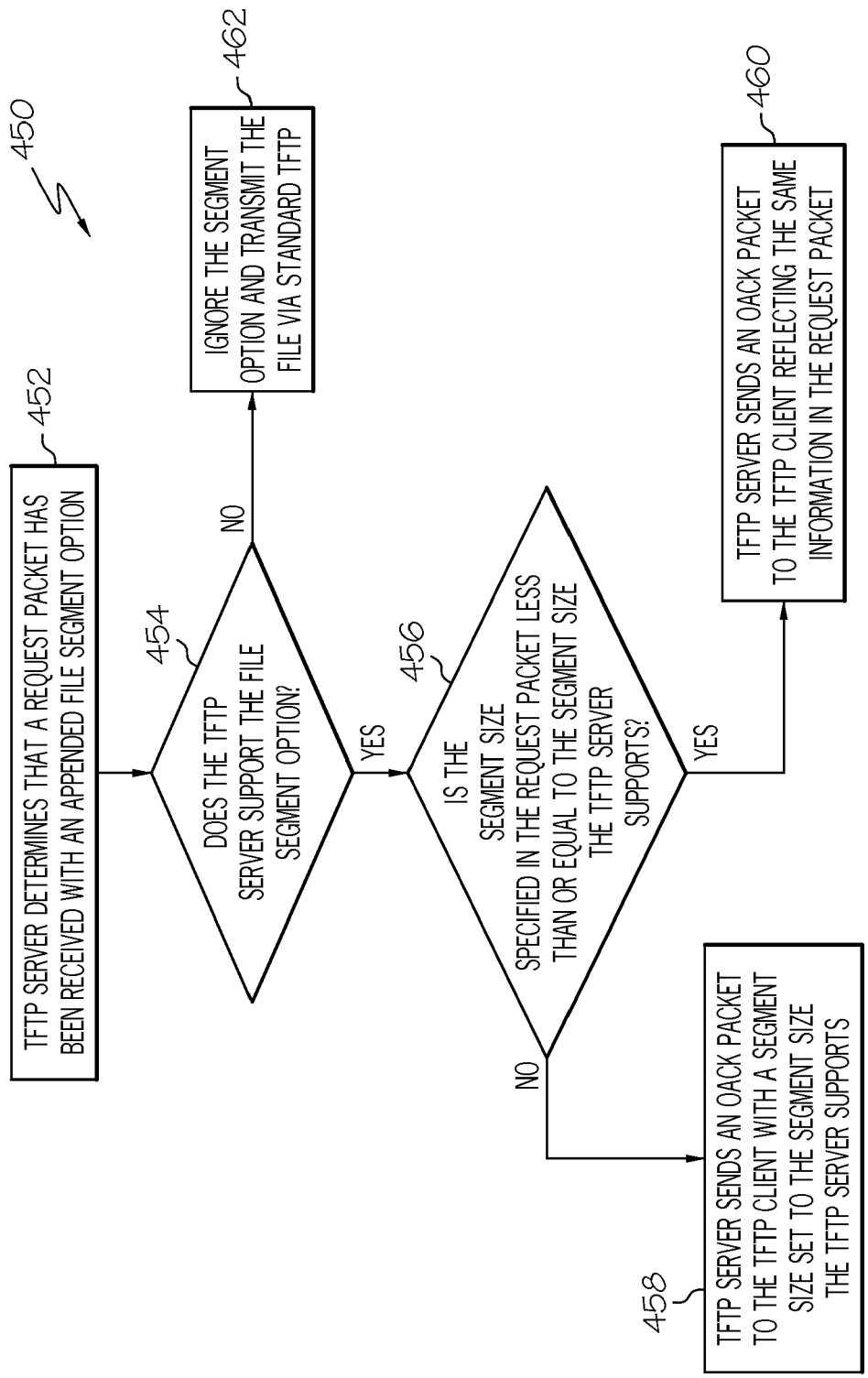

FIGS. 4A and 4B are flow diagrams of one embodiment of methods 400 and 450 for implementing the client side and server side, respectively, of the file segment option described above. The embodiment of methods 400 and 450 are described here as being implemented by the TFTP client software 132 in the client node 102 and the TFTP server software 130 in the server node 102, respectively.

Method 400 is used when a TFTP request is being made with the file segment option. This occurs, for example, if there is no file name associated with the data to be transferred or if the size of the data to be transferred exceeds the maximum file size that the TFTP client software 132 in the client node 102 can handle.

When a TFTP request is being made with the file segment option, the data that is to be transferred is transferred as multiple segments, where each segment is transferred in a separate transfer, but within the same TFTP session. From outside the TFTP client, the multiple TFTP data transfer appear to be a single logical TFTP session.

The TFTP client software 132 in the client node 102 sends a request packet to the TFTP server node 102 that has a file segment option appended to it for a first segment (block 402 shown in FIG. 4A). As noted above, there are two types of requests that can be sent—a read request (where the data to be transferred is transferred from the server node 102 to the client node 102) or a write request (where the data to be transferred is transferred from the client node 102 to the server node 102). Also, as noted above, the file segment option can have one of two modes—absolute mode and relative mode.

As a part of method 450 shown in FIG. 4B, when the TFTP server software 130 in the server node 102 determines that a request packet has been received that has a file segment option appended thereto (block 452), the TFTP server software 132 determines if the TFTP server node 102 supports the file segment option (block 454).

If the TFTP server software 130 in the server node 102 is able to satisfy the request, the TFTP server software 130 determines if the segment size specified in the file segment option is less than or equal to the segment size for TFTP server software 130 in the server node 102 (block 456). If that is the case, the TFTP server software 130 in the server node 102 sends an OACK packet to the TFTP client node 102 that includes the same information in the file segment option as was received in the request packet (block 458). If that is not the case, the TFTP software 124 sends an OACK packet to the TFTP client node 102 that includes the same information in the file segment option as was received in the request packet except for the segment size, which is set to the segment size of the TFTP server software 130 in the server node 102 (block 460).

If for some reason the TFTP server software 130 in the server node 102 is not able to satisfy the request specified in the received TFTP request packet, the TFTP server software 130 ignores the segment option and transmits the file via standard TFTP (block 462).

As a part of method 400 shown in FIG. 4A, if the TFTP client software 132 in the client node 102 receives an OACK in response to the request packet it sent (block 404), the TFTP client software 132 uses the segment size in the OACK packet as the segment size for the transfer of the first segment (block 406). Then, the TFTP server and TFTP client transfer the specified segment using standard TFTP ACK and DATA packets and the recipient stores the segment (block 408). In the case of a read request, the TFTP server software 130 in the server node 102 starts transferring to the client node 102 the segment that starts at the offset specified in the offset sub-field 216 of the file segment option. The TFTP server software 130 in the server node 102 reads and transfers successive bytes of data up to the number of bytes specified in the file size sub-field 218 of the OACK packet have been read and transferred to the client node 102 (or the entire remaining amount of data if the maximum file size specified in both the request packet and the OACK packet is 0). In the case of a write request, the TFTP client software 132 in the client node 102 transfers the segment to the server node 102 and the server node 102 stores the segment starting at the offset specified in the offset sub-field 216 of the file segment option. The client node 102 transfers up to the number of bytes specified in the file size sub-field 218 of the OACK packet (or the entire remaining amount of data if the maximum file size specified in both the request packet and the OACK packet is 0).

If the TFTP client software 132 in the client node 102 does not receive an OACK in response to the request packet, either the client node 102 receives the file via standard TFTP or terminates the transfer with a TFTP ERROR packet (block 410).

The processing described above in connection with block 402 through block 410 and block 452 through block 460 is repeated for each segment that needs to be transferred. In the particular embodiment shown in FIGS. 4A and 4B, each segment is transferred in series. That is, after a segment has been transferred, the TFTP client software 132 in the client node 102 checks if there are any remaining segments to transfer (block 412). If there are remaining segments to transfer, the processing described above in connection with block 402 through block 410 and block 452 through block 460 is repeated for the next segment that needs to be transferred. Otherwise if there are no remaining segments to transfer, the data transfer is complete (block 414).

Although not shown in FIGS. 4A and 4B, it is to be understood that appropriate error checking is typically also implemented in methods 400 and 450. For example, if the TFTP client specifies an absolute address that the TFTP server is unable to read from or write to, the TFTP server sends an TFTP error packet. Also, there should be no reason for the TFTP server to "reduce" the maximum file size to 0 since a value of 0 represents no limit. Therefore, if the TFTP client receives an OACK packet in which the file size sub-field 318 has been changed to a value of 0, the TFTP client sends a TFTP error packet.

Figure 5:
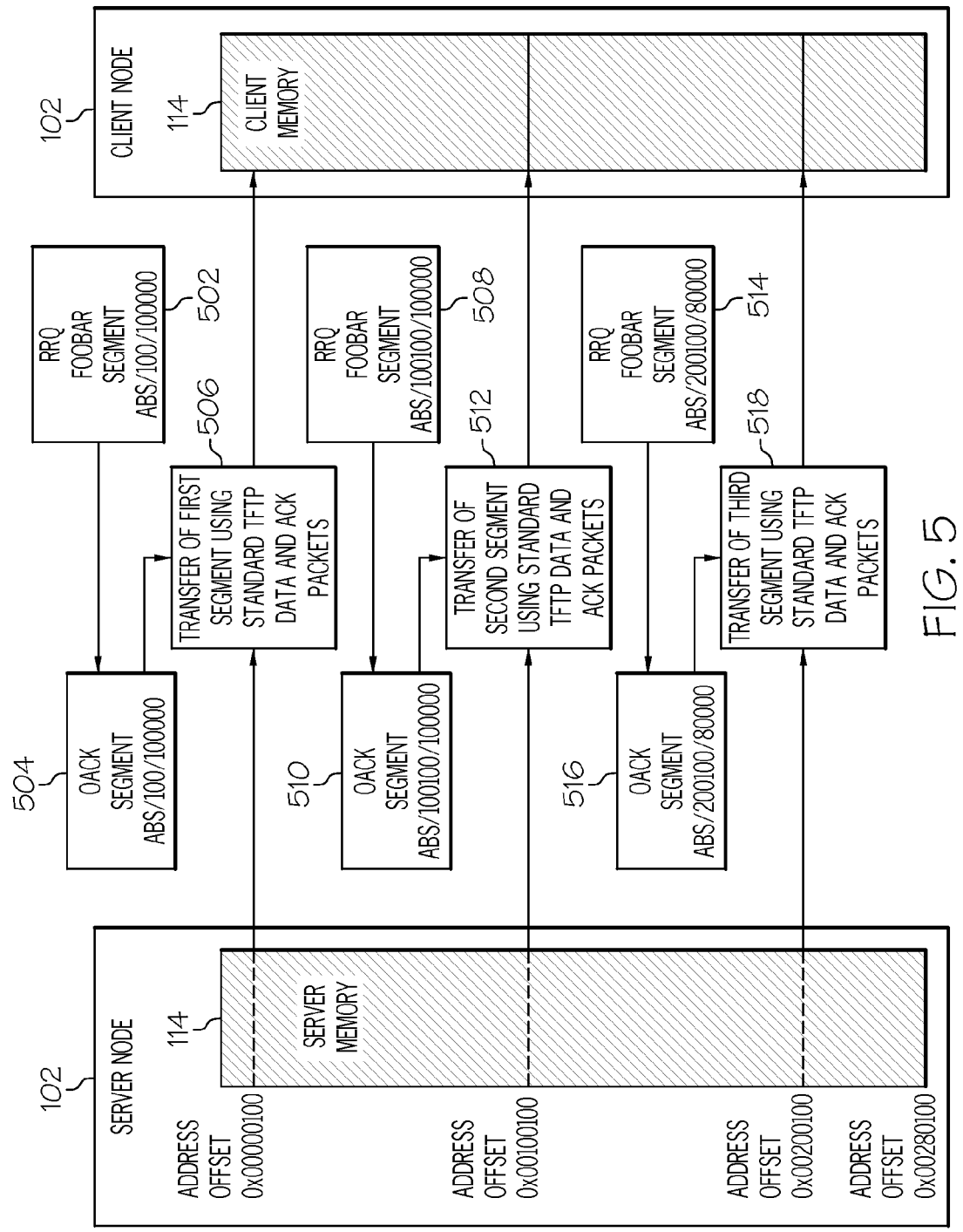
FIG. 5 illustrates one example of the operation of the methods shown in FIGS. 4A and 4B.

FIG. 5 illustrates one example of the operation of the methods 400 and 450 shown in FIGS. 4A and 4B, respectively. The example shown in FIG. 5 is described here as being implemented using the system 100 of FIG. 1, and the TFTP request and OACK packets shown in FIGS. 2A and 3A, respectively.

In this example, application-layer software 122 wishes to transfer a memory image from the memory 114 of the server node 102 to the memory 114 of the client node 102. The memory image to be transferred starts at address 0x00000100 and ends at address 0x0002800FF. In other words, the memory image to be transferred has a size of 0x00280000 or 2,621,440 bytes. Also, in this example, the TFTP software 124 in both the client node 102 and the server 102 are able to handle a maximum file size of 1 Mb or 1,048,576 bytes.

In this example, the application-layer software 122 in the client node 102 uses the TFTP client software 132 in the client node 102 to effectuate the transfer of the memory image.

The TFTP client software 132 in the client node 102 determines that the memory image should be transferred using the file segment option because there is no file name associated with the memory and because the size of the memory image exceeds the maximum file size that the TFTP client software 132 in the client node 102 can handle. As a result, the file segment option functionality 134 is used to transfer the file in multiple segments. Since both the client node 102 and the server 102 are able to handle a maximum file size of 1 Mb or 1,048,576 bytes, the memory image will be transferred in three segments—a first segment comprising 1 Mb or 1,048,576 bytes, a second segment comprising 1 Mb or 1,048,576 bytes, and a third segment comprising 512 Kb or 524,288 bytes.

The TFTP client software 132 in the client node 102 sends a first read request (RRQ) packet 502 to the TFTP server 102 requesting the transfer of the first segment. The first read request packet 502 has a file segment option appended thereto that identifies the first segment. In this example, the value field of the file segment option comprises the string "ABS/00000100/100000", which indicates that absolute mode should be used, that the segment to be transferred starts at the absolute address 0x00000100, and that the TFTP client software 132 in the client node 102 can handle a maximum file size of 1 Mb or 1,048,576 bytes. Because absolute mode is used, the file name specified in the file name field ("foobar" in this example) is ignored.

In this example, the TFTP server software 130 in the server node 102 is able to handle files having a size of 1 Mb or 1,048,576 bytes and, as a result, the TFTP server software 130 in the TFTP server node 102 sends a first OACK packet 504 in response to the first read request 502 that has a file segment option containing the same information as the file segment option appended to the first read request 502 (that is, "ABS/00000100/100000"). Then, the TFTP server software 130 in the TFTP server 102 transfers the first segment to the TFTP client 102 using standard TFTP DATA and ACK packets (block 506). The TFTP client node 102 stores the transferred segment in its memory 114.

After the first segment has been successfully transferred from the TFTP server 102 to the TFTP client 102, the TFTP client software 132 in the TFTP client node 102 sends a second read request packet 508 to the TFTP server 102 requesting the transfer of the second segment. The second read request packet 508 has a file segment option appended thereto that identifies the second segment. In this example, the value field of the file segment option comprises the string "ABS/00100100/100000", which indicates that absolute mode should be used, that the segment to be transferred starts at the absolute address 0x01000100, and that the TFTP client software 132 in the client node 102 can handle a maximum file size of 1 Mb or 1,048,576 bytes. Because absolute mode is used, the file name specified in the file name field ("foobar" in this example) is ignored.

The TFTP server 102 sends a second OACK packet 510 in response to the second read request 508 that has a file segment option containing the same information as the file segment option appended to the second read request 508 (that is, "ABS/00100100/100000"). Then, the TFTP server software 130 in the server node 102 transfers the second segment to the client node 102 using standard TFTP data packets (block 512). The TFTP client node 102 stores the transferred segment in its memory 114.

After the second segment has been successfully transferred from the TFTP server 102 to the TFTP client 102, the TFTP client software 132 in the client node 102 sends a third read request packet 514 to the server node 102 requesting the transfer of the third segment. The third read request packet 514 has a file segment option appended thereto that identifies the third segment. In this example, the value field of the file segment option comprises the string "ABS/00200100/100000", which indicates that absolute mode should be used, that the segment to be transferred starts at the absolute address 0x00200100, and that the TFTP client software 132 in the client node 102 can handle a maximum file size of 1 Mb or 1,048,576 bytes. Because absolute mode is used, the file name specified in the file name field ("foobar" in this example) is ignored.

The TFTP server software 130 in the server node 102 sends a third OACK packet 516 in response to the third read request 514 that has a file segment option containing the same information as the file segment option appended to the third read request 514 (that is, "ABS/00200100/100000"). Then, the TFTP server software 130 in the server node 102 transfers the third segment to the client node 102 using standard TFTP DATA and ACK packets (block 518). The TFTP client node 102 stores the transferred segment in its memory 114.

At this point, the transfer of the memory image has completed successfully.

Figure 6A:
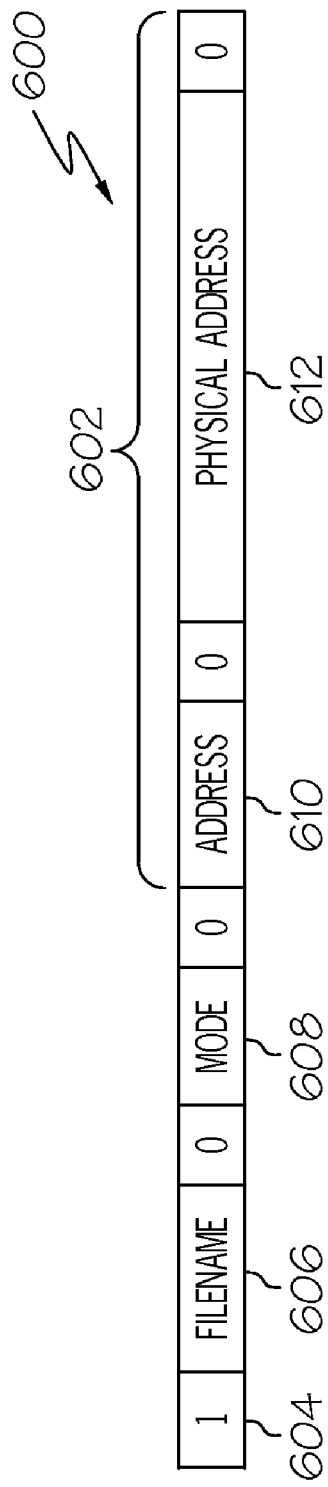
FIG. 6A illustrates one embodiment of a TFTP read request packet to which a file address option has been appended.

FIG. 6A illustrates one embodiment of a TFTP read request packet 600 to which a file address option 602 has been appended using the TFTP Option Extension mechanism described in IETF RFC 2347. The file address option 602 shown in FIG. 6A provides a mechanism by which a TFTP client can request that a TFTP server provide the TFTP client with a physical address for storing the requested data. In this particular embodiment, the file address option is only valid for use with read requests and not write requests.

As with the TFTP request packet 200 shown in FIG. 2A, the TFTP read request packet 600 comprises an opcode field 604, a filename field 606, and a mode field 608, all of which are the same as the corresponding fields described above in connection with FIG. 2A. Since the packet shown in FIG. 6A is a read request packet, the opcode filed 604 comprises the value 1.

In the example shown in FIG. 6A, a file address option 602 is appended to the TFTP request packet 600. The file address option 602 includes an option field 610 and a value field 612. The option field 610 includes a predetermined string that specifies that the file address option should be used to carry out the requested file transfer. One example of a suitable predetermined string is "address".

The value field 612 of the file address option 602, in the case of a read request packet 600, comprises a string specifying the width of the relevant address space in which the TFTP client will store the transferred data. The width of the relevant address space is specified, in this embodiment, by placing a string specifying the maximum address value for the address space in the value field 612. For example, a string of "FFFF" indicates that the client is looking for a 16-bit physical address in return.

Figure 6B:
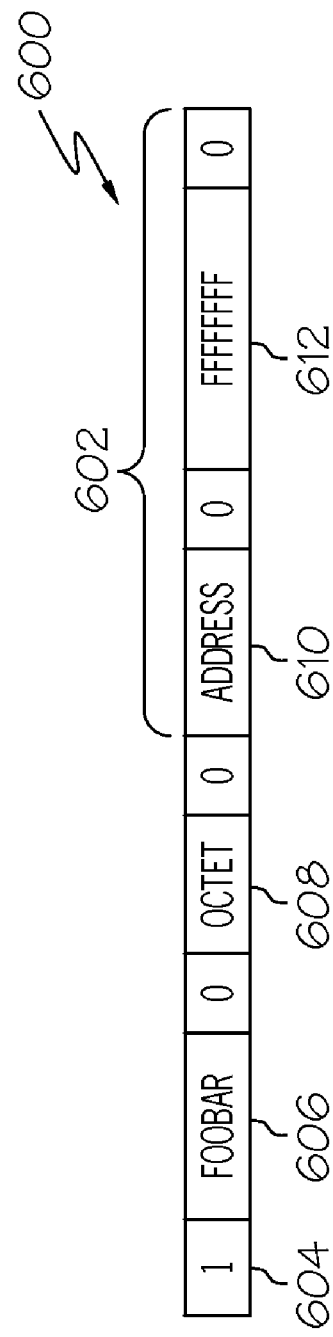
FIG. 6B illustrates one example of a TFTP request packet having a file address option appended thereto.

FIG. 6B illustrates one example of a TFTP request packet 600 having a file address option 602 appended thereto. In the example shown in FIG. 6B, the TFTP client sends a read request to a TFTP server for data that is associated with a file name of "foobar" and requests that the TFTP server specify at what physical address the transferred data should be stored. In this example, the file name field 606 of the read request packet 600 includes the string "foobar" and the value field 612 of the file address option 602 contains the hexadecimal string "FFFFFFFF", indicating that the client is looking for a 32-bit physical address in return.

Figure 7A:
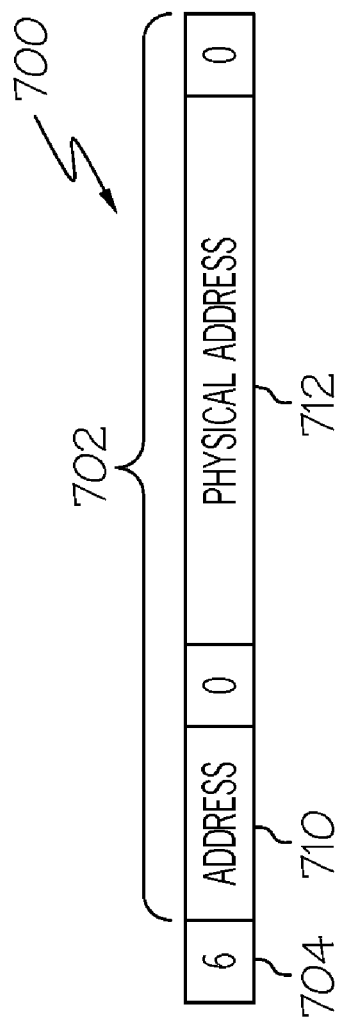
FIG. 7A illustrates one embodiment of an OACK packet for responding to a TFTP request packet of the type shown in FIG. 6A that has a file address option appended thereto.

FIG. 7A illustrates one embodiment of a TFTP Options Acknowledgment (OACK) packet 700 for responding to a TFTP request packet 600 of the type shown in FIG. 6A that has a file address option 602 appended thereto. The OACK packet 700 has a file address option 702 appended to it.

The TFTP OACK packet 700 includes an opcode field 704, which for an OACK packet, contains the value "6", and which indicates that the packet 700 is an OACK packet. As noted above, an OACK packet 700 will contain a corresponding option for each option that was appended to the corresponding request that the server recognizes and handles.

In the particular example shown in FIG. 7A, the OACK packet 700 contains a single option (the file address option 702) that corresponds to the file address option 602 appended to the request packet 600. The file address option 702 in the OACK packet 700 has the same format as the file address option 602 in the request packet 600.

The file address option 702 includes an option field 710 and a value field 712. The option field 710 includes the same predetermined null-terminated string used in the file address option 702 in the read request packet 700. As noted above, in this example, the string "address" is used. The value field 712 in the OACK packet 700 comprises a null-terminated string that specifies the physical address where the TFTP client should store the transferred data.

When a TFTP client sends a TFTP read request 600 including the file address option 602 to a TFTP server and the TFTP server is able to satisfy the read request, the TFTP server sends an OACK packet 700 to the TFTP client that specifies the physical address where the TFTP client should store the transferred data.

After the sending the OACK packet 702, the TFTP server and TFTP client proceed with the requested transfer and the TFTP client stores the transferred data starting at the physical address specified in the value field 712 of the file address option 702 of the OACK packet 700.

Figure 7B:
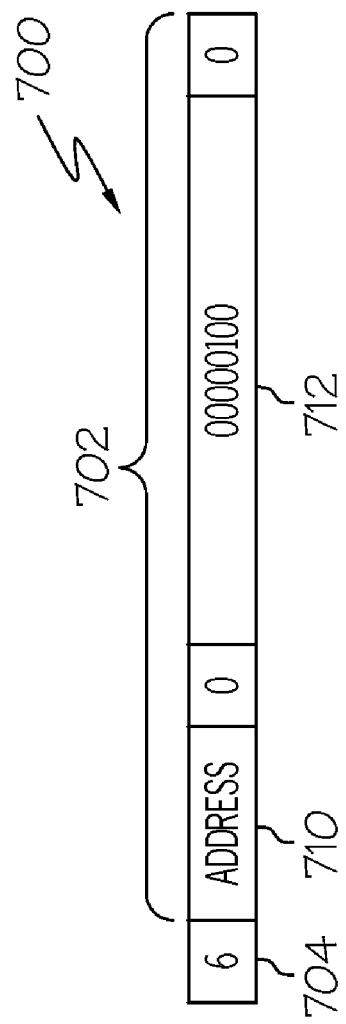
FIG. 7B illustrates an example of an OACK packet that is sent by a TFTP server in response to the particular example TFTP request packet shown in FIG. 6B if the TFTP server is able to satisfy the read request.

FIG. 7B illustrates an example of an OACK packet 700 that is sent by a TFTP server in response to the particular example TFTP request packet shown in FIG. 6B if the TFTP server is able to satisfy the read request. As shown in FIG. 7B, the file address option 702 of this OACK packet 700 contains an option field 710 that contains the same string as the read request packet 600 (that is, the string "address") and the value field 712 contains the value "0x00000100", which indicates that the TFTP client should start storing the transferred data at that physical address.

Figure 8A:
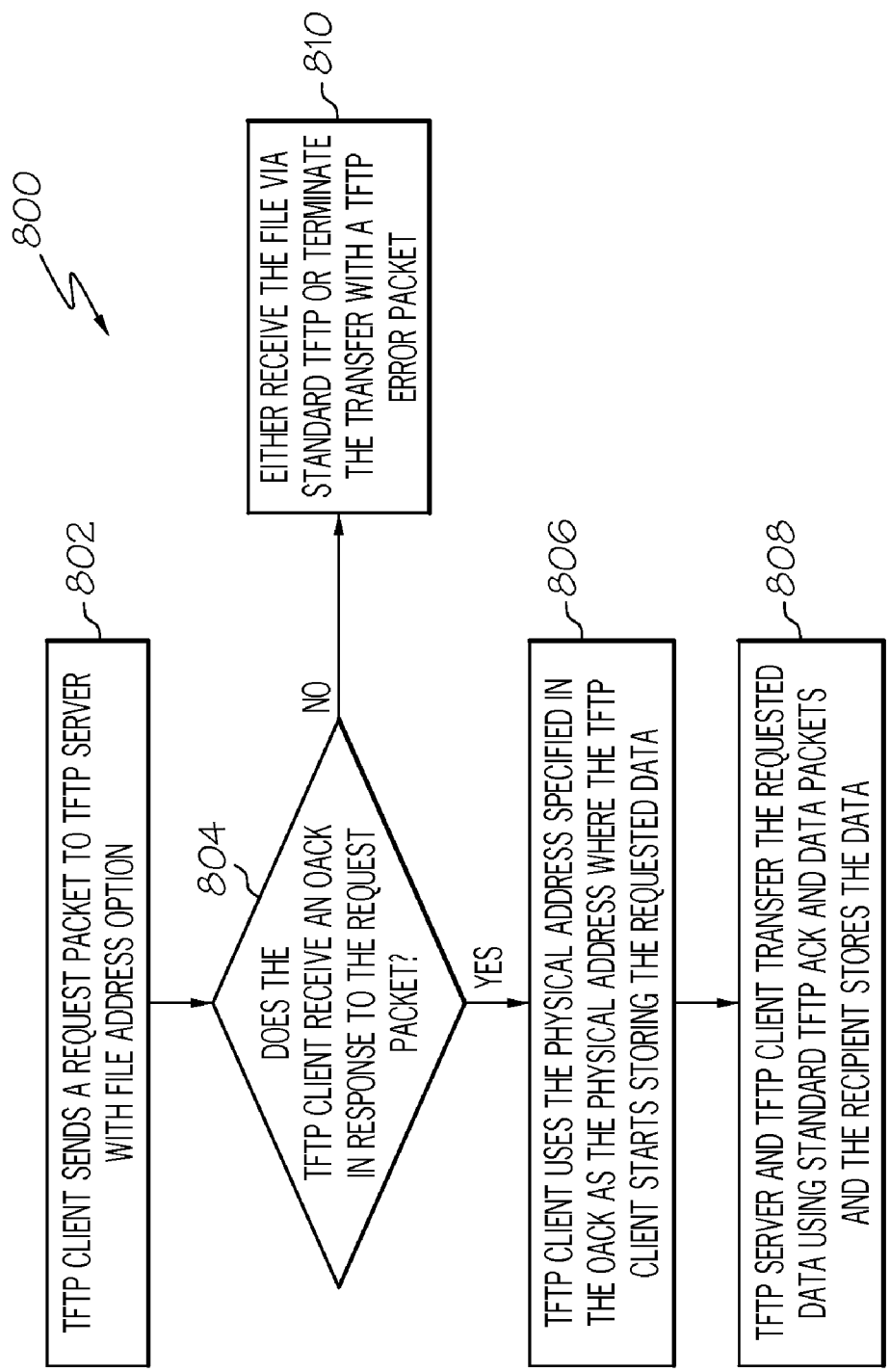
FIGS. 8A and 8B are flow diagrams of one embodiment of methods for implementing the client side and server side, respectively, of the file address option.
Figure 8B:
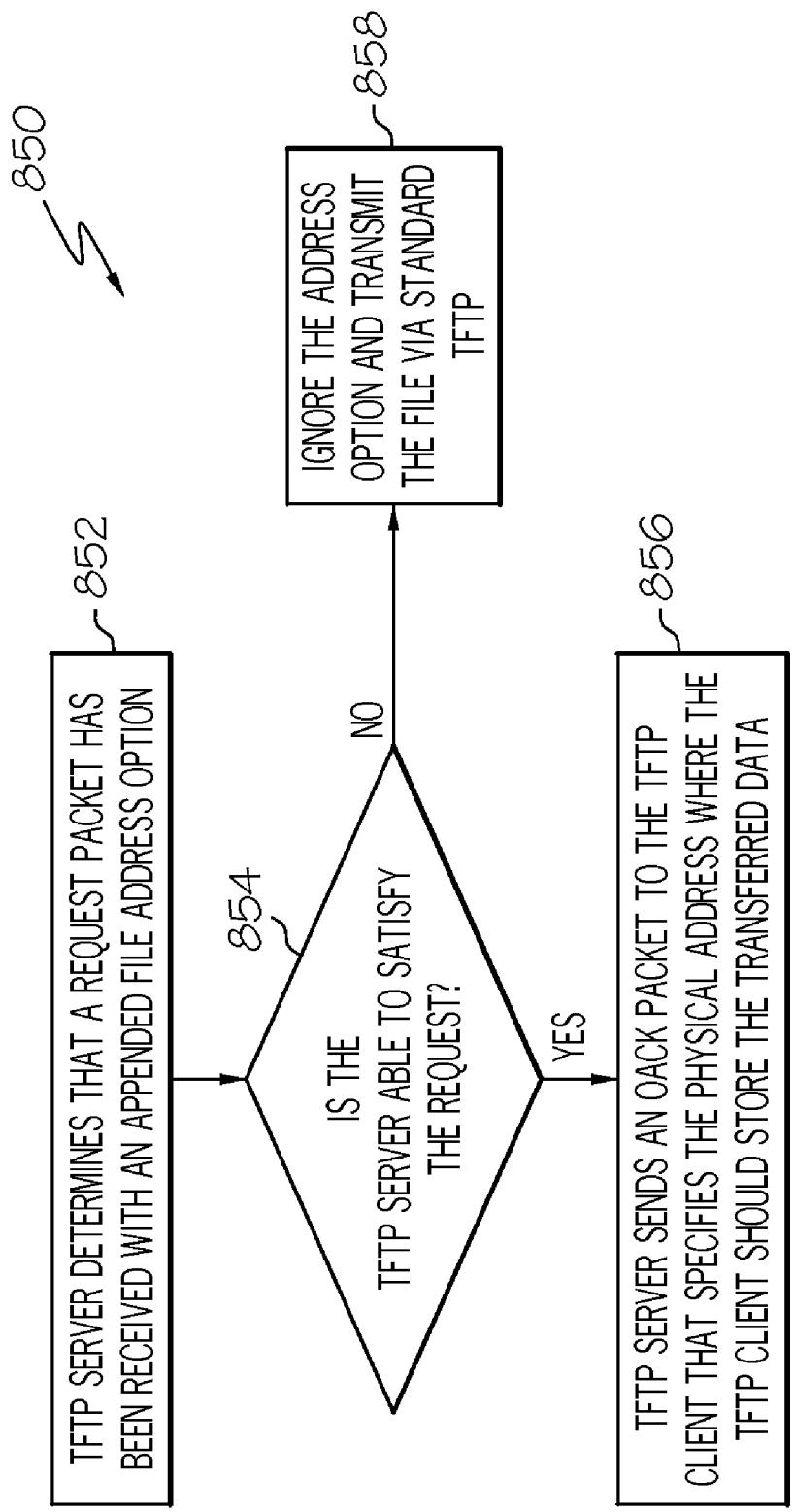

FIGS. 8A and 8B are flow diagrams of one embodiment of methods 800 and 850 for implementing the client side and server side, respectively, of the file address option described above. The embodiment of methods 800 and 850 are described here as being implemented by the TFTP client software 132 in the client node 102 and the TFTP server software 130 in the server node 102, respectively.

Method 800 is used when a TFTP read request is being made using the file address option.

The TFTP client software 132 in the client node 102 sends a read request packet to the TFTP server node 102 that has a file address option appended to it (block 802). As noted above, the file address option includes an option field that contains the predetermined null-terminated string specifying that the file address option is being requested and a value field that contains a null-terminated string specifying the maximum address value for the address space.

As a part of method 850 shown in FIG. 8B, when the TFTP sever software 130 in the server node 102 determines that a TFTP read request packet has been received that has a file address option appended thereto (block 852), the TFTP server software 130 determines if it is able to satisfy the request (block 854).

If the TFTP server software 130 in the server node 102 is able to satisfy the request, the TFTP server software 130 sends an OACK packet to the client node 102 having a file address option appended thereto that specifies the physical address where the TFTP client software 132 in the client node 102 should start storing the transferred data (block 856).

If for some reason the TFTP server software 130 in the server node 102 is not able to satisfy the request specified in the received TFTP request packet (for example, the server node 102 does not support the address option), the TFTP server software 130 ignores the address option and transmits the file via standard TFTP (block 858).

As a part of method 800 shown in FIG. 8A, if the TFTP client software 132 in the client node 102 receives an OACK packet in response to the request packet it sent (block 804), the TFTP client software 132 in the client node 102 uses the physical address specified in the OACK packet as the physical address where the TFTP client software 132 in the client node 102 starts storing the requested data (block 806). Then, the TFTP server and TFTP client transfer the requested data using standard TFTP ACK and DATA packets (block 808). The TFTP client software 132 in the client node 102 stores the data it receives from the server node 102 starting at the physical address specified in the OACK packet.

If the TFTP software 124 in the client node 102 does not receive an OACK in response to the request packet, the client node 102 either receives the file via standard TFTP or terminates the transfer with a TFTP ERROR packet (block 810).

Although not shown in FIGS. 8A and 8B, it is to be understood that other appropriate error checking is typically also implemented in methods 800 and 850. For example, if the TFTP client specifies a file that the TFTP server is unable to read, the TFTP server sends an TFTP error packet.

Figure 9:
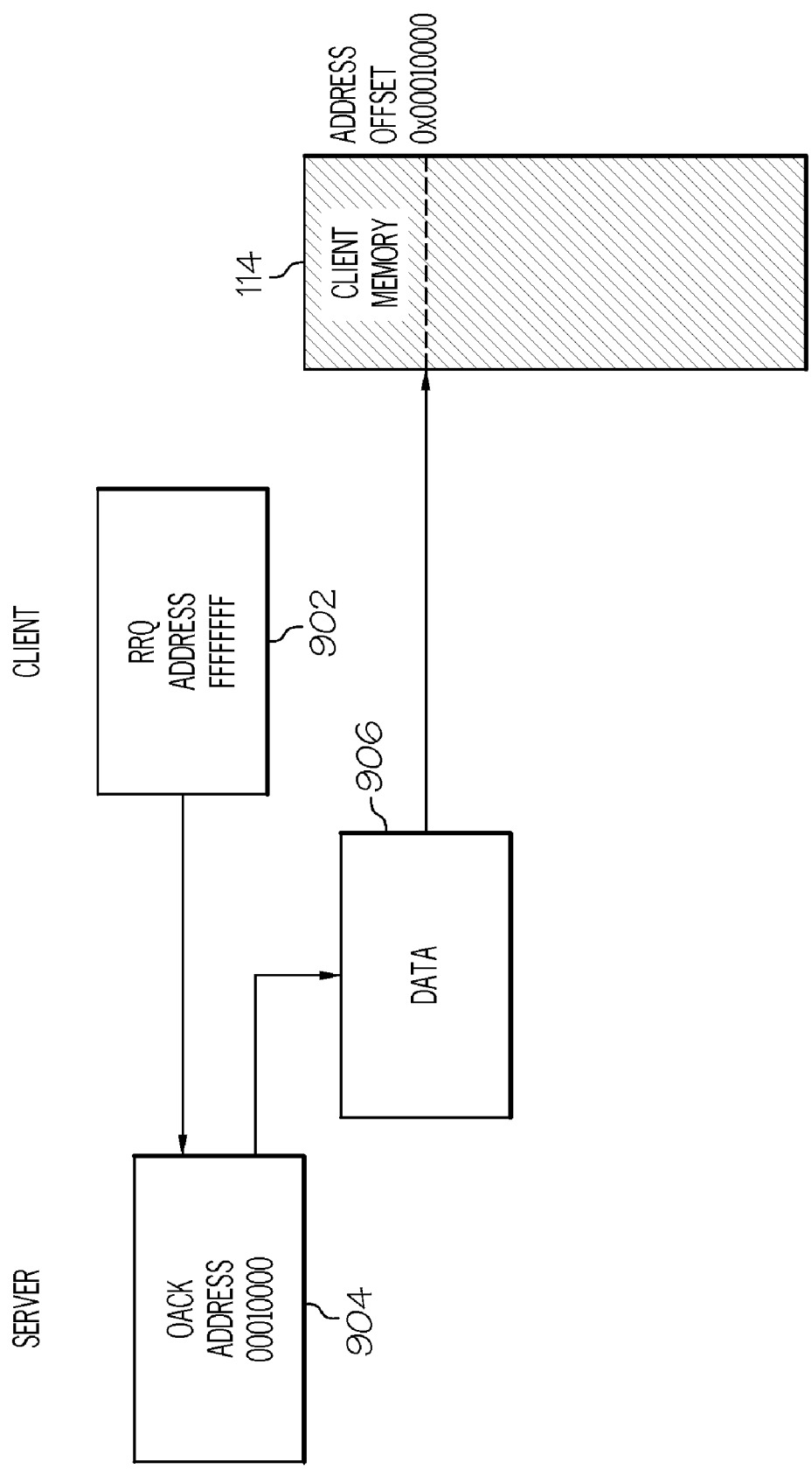
FIG. 9 illustrates one example of the operation of the methods shown in FIGS. 8A and 8B.

FIG. 9 illustrates one example of the operation of the methods 800 and 850 shown in FIGS. 8A and 8B, respectively. The example shown in FIG. 9 is described here as being implemented using the system 100 of FIG. 1, and the TFTP request and OACK packets shown in FIGS. 6A and 7A, respectively.

In this example, application-layer software 122 running on the client node 102 wishes to transfer a memory image from the memory 114 of the server node 102 to the memory 114 of the client node 102 but needs the TFTP server software 130 on the server node 102 to indicate at what physical address the TFTP client software 130 in the client node 102 should start storing the data transferred from the server node 102.

In this example, the application-layer software 122 in the client node 102 uses the TFTP client software 132 in the client node 102 to effectuate the transfer of the memory image.

The TFTP client software 130 in the client node 102 sends a read request packet 902 to the server node 102 requesting the transfer of the memory image. In this example, the particular memory image to be transferred is associate with the specified file name "image1". The read request packet 902 has a file address option appended thereto in which the value of "FFFFFFFF" is stored in the value field 612, which indicates that the memory 114 in the client node 102 has a 32-bit address space.

In this example, the TFTP server software 130 in the server node 102 sends an OACK packet 904 to the client node 102 with a file address option that has the string "00010000" stored in the value field 712, which specifies that the client node 102 should start storing the transferred data at the physical address of 0x00010000 in the memory 114 in the client node 102.

The TFTP client software 132 in the client node 102 receives the OACK packet 904. Then, the TFTP server and TFTP client transfer the requested data using standard TFTP ACK and DATA packets (block 906). The TFTP client software 132 in the client node 102 stores the data it receives from the server node 102 starting at the physical address specified in the OACK packet.

Figure 10:
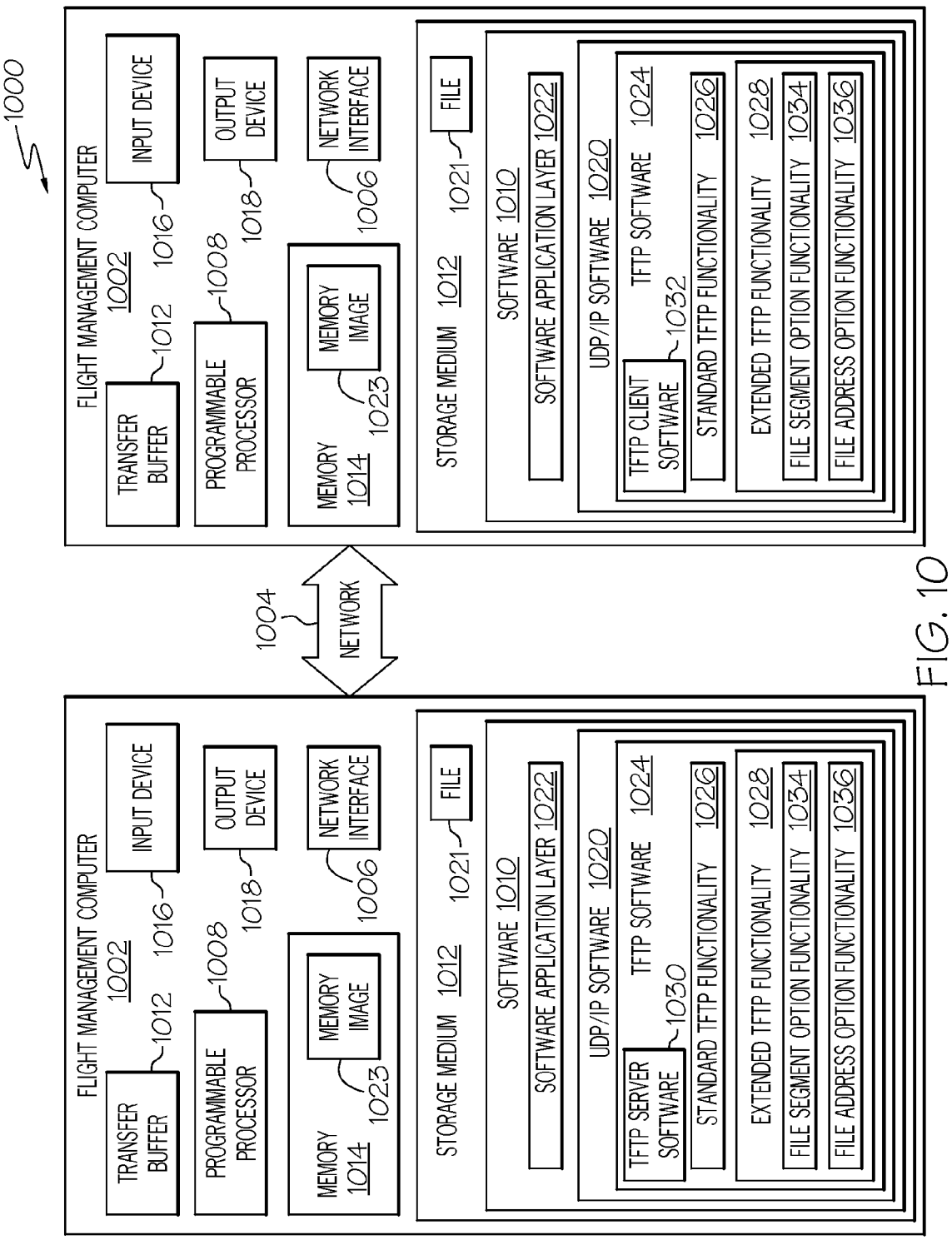
FIG. 10 is a block diagram of one embodiment of an avionics system that is suitable for use with the extended TFTP functionality described here.

FIG. 10 is a block diagram of one embodiment of an avionics system 1000 that is suitable for use with the extended TFTP functionality described above. The avionics system 1000 comprises two flight management computers (FMC) 1002 that are implemented as separate nodes of a network 1004. Each FMC 1002 includes an appropriate network interface 1006 to communicatively couple the respective FMC 1002 to the network 1004. In this embodiment, the network 1004 is implemented to support the ARINC 615A standard, which uses ETHERNET networking technology and the UDP/IP suite of protocols.

In the embodiment shown in FIG. 10, each of the FMCs 1002 further comprises one or more programmable processors 1008 for executing software 1010. The software 1010 in each FMC 1002 comprises program instructions that are stored (or otherwise embodied) on or in an appropriate storage medium or media 1012 (such as flash or other non-volatile memory, magnetic disc drives, and/or optical disc drives) from which at least a portion of the program instructions are read by the programmable processor 1008 for execution thereby. Although the storage media 1012 is shown in FIG. 10 as being included in, and local to, the respective FMC 1002, it is to be understood that removable media and/or remote storage media (for example, storage media that is accessible over the network 1004) can also be used. Each FMC 1002 also includes memory 1014 for storing the program instructions (and any related data) during execution by the programmable processor 1008. Memory 1014 comprises, in one implementation, any suitable form of random access memory (RAM) now known or later developed, such as dynamic random access memory (DRAM). In other embodiments, other types of memory are used.

Each FMC 1002 further includes one or more input devices 1016 that are communicatively coupled to the respective programmable processor 1008 by which a user is able to provide input to that programmable processor 1008. Examples of input devices include a keyboard, keypad, touch-pad, pointing device, button, switch, and microphone. Each FMC 1002 also includes one or more output devices 1018 that are communicatively coupled to the respective programmable processor 1008. Each programmable processor 1008 is able to output information or data to a user on or using one or more of the output devices 1008. Examples of output devices 1018 include visual output devices such as liquid crystal displays (LCDs) or light emitting diodes (LEDs) or audio output devices such as speakers.

The software 1010 executed by the programmable processor 1008 in each node 1002 includes UDP/IP software 1020 and flight-management software 1022 that implements various flight-management functions. The UDP/IP software 1020 includes TFTP software 1024. The TFTP software 1024 includes standard TFTP functionality 1026 that implements standard TFTP and extended TFTP functionality 1028. The TFTP software 1024 also includes TFTP server software 1030 for the server FMC 1002 and TFTP client software 1032 for the client FMC 1002. The extended TFTP functionality 1028 includes file segment option functionality 1034 and file address option functionality 1036. The TFTP software 1024, standard TFTP functionality 1026, extended TFTP functionality 1028, file segment option functionality 1034, and file address option functionality 1036 are all the same as the TFTP software 124, standard TFTP functionality 126, extended TFTP functionality 128, file segment option functionality 134, and file address option functionality 136 described above in connection with FIGS. 1-9.

The FMCs 1002 also include appropriate interfaces 1040 for communicatively coupling the FMC 1002 to one or more sensors and/or actuators with which the FMC 102 (and, for example, the flight-management software 1022) communicates.

The FMCs 1002 are deployed within an aerospace vehicle (such as an airplane or helicopter). In operation, one of the FMCs 1002 operates as the "primary" FMC 1002 that provides flight-management related services for the vehicle. The other FMC 1002 serves as the "backup" FMC 1002. In the event that the primary FMC 1002 is unable to operate correctly, the backup FMC 1002 takes over as the primary FMC 1002 and provides flight-management related services for the vehicle. In order for this switchover from the primary FMC 1002 to the backup FMC 1002 to occur with minimal disruption, the contents of the primary FMC's 1002 memory 1014 are periodically copied to the memory 1014 of the backup FMC 1002 in a cross-loading operation. In this embodiment, this cross-loading operation is performed using the file segment option and/or the file address option that is implemented by the TFTP software.

As noted above, standard TFTP cannot be used for cross loading a memory image from the memory of one FMC 1002 to the memory 1014 of another FMC 1002 since a file system is typically not used to manage the data stored within the memory 1014 of the FMCs 1002. Also, because modern flight management computers use large amounts of memory, the size of the resulting memory images typically exceed the size of the buffers typically used in the TFTP software that is otherwise used for data loading. However, the extended TFTP functionality 1026 addresses these issues. The file segment option enables very large files and memory images (or other data that is not stored in a file system) to be transferred in multiple segments using TFTP software. The file address option also enables TFTP software to transfer memory images (or other data not stored in a file system) using TFTP software.

In this embodiment, standard TFTP software that would otherwise be provided for data loading purposes is extended to include the extended TFTP functionality 1028 (including the file segment option functionality 1034 and the file address option functionality 1036), which is used to carry out the cross-loading operation. Because software that is used in avionics systems typically needs to be certified by an appropriate regulatory agency (for example, the Federal Aviation Agency (FAA) in the Unites States), the TFTP software 1024 would need to be certified for use in avionics application. However, once certified, the TFTP software 1024 with the extended TFTP functionality 1028 can be used with different avionics system.

In another embodiment of an implementation of the TFTP extended features includes a personal computer for loading files or transferring a memory image onto a processor board (for example, a debugging station).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of transferring data using a Trivial File Transport Protocol (TFTP), the method comprising:
    sending a first request packet from a client to a server, the first request packet comprising a first TFTP option requesting that a first segment of a grouping of data be transferred; and
    if a first option acknowledgment packet comprising a second TFTP option corresponding to the first TFTP option is received at the client from the server, transferring the first segment of the grouping of data as indicated in the second TFTP option using TFTP;
    sending a second request packet from the client to the server, the second request packet comprising a third TFTP option requesting that a second segment of the grouping of data be transferred;
    if a second option acknowledgment packet comprising a fourth TFTP option corresponding to the third TFTP option is received at the client from the server, transferring the first segment of the grouping of data as indicated in the fourth TFTP option using TFTP;
    wherein the first segment of data is transferred in a first TFTP session; and
    wherein the second segment of data is transferred in a second TFTP session that begins after the first TFTP session is completed.

2. The method of claim 1, wherein the first request packet comprises one of a read request and a write request, wherein, if the first request packet is a read request, transferring the first segment of the grouping of data comprises transferring the first segment of the grouping of data from the server to the client and wherein, if the first request packet is a write request, transferring the first segment of the grouping of data comprises transferring the first segment of the grouping of data from the client to the server.

3. The method of claim 1, wherein the first TFTP option includes a first segment size that the client is able to transfer and a second segment size that the server is able to transfer, wherein the second TFTP option includes one of the lesser of the first segment size that the client is able to transfer and the second segment size that the server is able to transfer, wherein the size of the first segment is one of (i) the lesser of the first segment size that the client is able to transfer and the second segment size that the server is able to transfer; and (ii) the entire grouping of data.

4. The method of claim 3, wherein the first TFTP option and the second TFTP option identify a beginning of the first segment of the grouping of data in one of the following ways: (i) by specifying a relative offset from a start of the grouping of data; and (ii) by specifying an absolute address for the start of the first segment.

5. The method of claim 1, wherein the grouping of data comprises at least one of a file stored in a file system and data not stored in a file system.

6. The method of claim 5, wherein the data not stored in a file system comprises a memory image.

7. The method of claim 1, wherein the server is a part of a first flight management computer and the client is a part of a second flight management computer, wherein the grouping of data comprises a memory image in the first flight management computer that is cross-loaded into the second flight management computer.

8. The method of claim 1, further comprising:
    sending a read request packet from the client to the server, wherein the read request packet identifies data to be transferred from the server to the client and wherein the read request packet comprises a fifth TFTP option requesting that the server specify a physical address where the client should start storing the requested data; and
    if a third option acknowledgment packet comprising a sixth TFTP option corresponding to the fifth TFTP option is received at the client from the server, wherein the sixth TFTP option specifies the physical address where the client should start storing the requested data:
        transferring the requested data from the server to the client; and
        storing the transferred data at the client starting at the physical address.

9. The method of claim 8, wherein the fifth TFTP option included in the read request packet specifies the width of the physical address where the client should start storing the requested data.

10. The method of claim 9, wherein the fifth TFTP option included in the read request packet specifies the width of the physical address where the client should start storing the requested data by specifying a maximum address for an address space where the client is to store the requested data.

11. A system comprising:
    a first node and a second node, wherein each of the first and second nodes comprises:
        a respective network interface to communicatively couple that node to the other node;
        a respective programmable processor coupled to the respective network interface,
    wherein the programmable processor executes software that includes TFTP software;
    wherein the TFTP software included in the first node is configured to send a read request packet from the first node to the second node, wherein the read request packet identifies data to be transferred from the second node to the first node and wherein the read request packet comprises a first TFTP option requesting that the second node specify a physical address where the first node should start storing the requested data;

wherein the TFTP software included in the second node is configured to receive the read request packet and if the TFTP software in the second node is able to satisfy the read request, the TFTP software included in the second node sends a first option acknowledgment packet comprising a second TFTP option corresponding to the first TFTP option, wherein the second TFTP option specifies the physical address where the first node should start storing the requested data;

wherein the TFTP software included in the first node is configured to receive the first option acknowledgment packet;

wherein the TFTP software included in the first node and the TFTP software included in the second node are configured to transfer the requested data from the second node to the first node; and wherein the TFTP software included in the first node is configured to store the transferred data at the first node starting at the physical address.

12. The system of claim 11, wherein the first TFTP option included in the read request packet specifies the width of the physical address where the first node should start storing the requested data.

13. The system of claim 12, wherein the first TFTP option included in the read request packet specifies the width of the physical address where the first node should start storing the requested data by specifying a maximum address for an address space where the first node is to store the requested data.

14. The system of claim 11, wherein the first node comprises a first flight management computer and the second node comprises a second flight management computer, wherein the requested data comprises a memory image in the first flight management computer that is cross-loaded into the second flight management computer.

15. The system of claim 11, wherein the TFTP software included in the first node is configured to send a request packet to the second node, the request packet comprising a third TFTP option requesting that a segment of a grouping of data be transferred;

wherein the TFTP software included in the second node is configured to receive the request packet and if the TFTP software in the second node is able to satisfy the request, the TFTP software included in the second node sends a second option acknowledgment packet comprising a fourth TFTP option corresponding to the third TFTP option to the first node;

wherein the TFTP software included in the first node is configured to receive the second option acknowledgment packet with the fourth TFTP option; and wherein the TFTP software included in the first node and the TFTP software included in the second node are configured to transfer the segment if the second node sends, and the first node receives, the second option acknowledgment packet with the fourth TFTP option.

16. The system of claim 15, wherein the request packet comprises one of a read request and a write request;

wherein, if the request packet is a read request, the segment is transferred from the second node to the first node; and wherein, if the request packet is a write request, the segment is transferred from the first node to the second node; and wherein the grouping of data comprises at least one of a file stored in a file system and data not stored in a file system.

17. A program product for transferring data using a Trivial File Transport Protocol (TFTP), the program-product comprising a non-transitory processor-readable medium on which program instructions are embodied, wherein the program instructions are operable, when executed by at least one programmable processor included in a device, to cause the device to:

receive a first request packet comprising a first TFTP option requesting that a first segment of a grouping of data be transferred, the first request packet being sent from a client;

if the device is able to satisfy the request:
send a first option acknowledgment packet comprising a second TFTP option to the client that corresponds to the first request packet; and
transfer the first segment using TFTP for storage at one of the device and the client;

receive a second request packet comprising a third TFTP option requesting that a second segment of the grouping of data be transferred, the first request packet being sent from the client;

if the device is able to satisfy the second request:
send a second option acknowledgment packet comprising a fourth TFTP option to the client that corresponds to the second request packet; and
transfer the second segment using TFTP for storage at the one of the device and the client;

wherein the first segment is transferred in a first TFTP session; and wherein the second segment is transferred in a second TFTP session that begins after the first TFTP session is completed.

18. The program product of claim 17, wherein the program instructions are further operable, when executed by the at least one programmable processor included in the device, to cause the device to:

receive a read request packet from a client, wherein the read request packet identifies data to be transferred from the device to the client and wherein the read request packet comprises a fifth TFTP option requesting that the device specify a physical address where the client should start storing the requested data;

if the device is able to satisfy the read request:
send a third option acknowledgment packet comprising a sixth TFTP option, wherein the sixth TFTP option specifies the physical address where the client should start storing the requested data;
transfer the requested data from the server to the client for storage by the client starting at the physical address specified in the sixth TFTP option.

* * * * *